United States Patent [19]

Uchida et al.

[11] Patent Number: 4,494,497

[45] Date of Patent: Jan. 22, 1985

[54] AUTOMATIC ENGINE STOP-RESTART SYSTEM

[75] Inventors: Shigekatsu Uchida; Takao Akatsuka; Takahide Kawamura, all of Aichi, Japan

[73] Assignee: Toyota Jidosha Kogyo Kabushiki Kaisha, Toyota, Japan

[21] Appl. No.: 387,819

[22] Filed: Jun. 14, 1982

[30] Foreign Application Priority Data

Jul. 20, 1981 [JP] Japan .................................. 56-113151

[51] Int. Cl.³ .............................................. F02D 17/00
[52] U.S. Cl. .......................... 123/179 B; 123/198 DB; 123/198 DC
[58] Field of Search ........ 123/179 B, 179 BG, 179 A, 123/198 DB, 198 DC; 180/54 R; 307/10 R; 290/37 A

[56] References Cited

U.S. PATENT DOCUMENTS

| | | | |
|---|---|---|---|
| 3,872,316 | 3/1975 | Kurii et al. | 123/179 B |
| 3,941,204 | 3/1976 | Kurii et al. | 123/179 B |
| 4,192,279 | 3/1980 | Maisch et al. | 123/179 A |
| 4,286,683 | 9/1981 | Zeigner et al. | 123/179 B |
| 4,364,343 | 12/1982 | Malik | 123/179 B |

FOREIGN PATENT DOCUMENTS 2447579  5/1975  Fed. Rep. of Germany ...... 123/198 DC Primary Examiner—Andrew M. Dolinar
Attorney, Agent, or Firm—Oblon, Fisher, Spivak, McClelland & Maier

[57] ABSTRACT

In automatically stopping or restarting an engine on a basis of detecting an operational state of each component of a vehicle with the engine mounted thereon, judgement as to whether first condition of setting the function of allowing the engine to automatically stop and restart, second condition of automatically stopping the engine after the function is set and third condition of automatically restarting the engine after the function is set are fulfilled or not, respectively, is made by "and" of a plurality of signals including at least two or more signals out of a signal indicating an engine rotational speed, a signal indicating the generating condition of an alternator and a third signal indicating readiness or unreadiness for starting of the vehicle.

4 Claims, 4 Drawing Figures

AUTOMATIC ENGINE STOP-RESTART SYSTEM

BACKGROUND OF THE INVENTION

This invention relates to an automatic engine stop-restart system for automatically stopping an engine under some predetermined conditions, and thereafter, automatically restarting the engine under other predetermined conditions.

In general, during running on a road, when a vehicle has to be stopped for a long period of time because of a traffic jam due to a signal waiting, an accident caused by another vehicle or the like, an engine may be temporarily stopped, and thereafter, restarted after the traffic jam has gone. This is done so as to avoid useless fuel consumption due to an idle operation for a long period of time.

Referring to the running through an urban district, the periods of time for vehicle stopping in the urban district comprises a fairly large percentage of the whole operating time of the vehicle, and the amount of exhaust gases and the quantity of fuel consumed therefor are not neglectable. Therefore, it is conceivable that, upon stopping of the vehicle for the signal waiting and the like during running in the urban district, the engine of the vehicle is stopped by manual operation. However, the stopping of the engine by manual operation each time of the signal waitings leads to the manually engine restarting operation, thereby resulting in a troublesome operation and a delayed starting operation of the vehicle.

There has heretofore been developed an automatic engine stop-restart system wherein, when a motor car is stopped at an intersection or the like during running through an urban district, if it is desirable to temporarily stop the engine for the purpose of improving the fuel consumption rate, the engine is automatically stopped, and thereafter, automatically restarted by a normal starting operation, which is effected at the time of starting the vehicle, such as a depression of a clutch pedal.

In the system of the type described, heretofore, rotation of the engine has been judged only by the level of an output voltage from an alternator, and an automatic stop and restart have been effected based on the result of the judgement. In consequence, there has been a possibility that, if the output voltage from the alternator in level is dropped to substantially zero despite of rotation of the engine, judgement is made that the engine does not rotate, whereby a starter is driven.

On the other hand, in the automatic engine stop-restart system of the type described, a rotational speed of the engine is detected by means of an engine rotation sensor separately of the output voltage of the alternator, and various controls are effected based on the result of the detection. Therefore, when no output is emitted from the rotation sensor due to a trouble therein despite of rotation of the engine, control means judges that the engine is stopped, and the result of the judgement causes a control output corresponding to the engine stopped condition to be fed to various actuators, thus not securing the safety of a vehicle using the system of the type described.

SUMMARY OF THE INVENTION

The present invention has been developed to obviate the above-described disadvantages of the prior art and has as its object the provision of an automatic engine stop-restart system for improvements in the safety of a motor vehicle and the reliability of the system.

To achieve the above-described object, the present invention contemplates that a function of allowing the engine to automatically stop under some predetermined conditions and to automatically restart under other predetermined conditions can be set under further predetermined conditions as deemed necessary, and judgement as to whether or not these three conditions are fulfilled is made by "and" (logical product) of a plurality of signals including two or more signals out of a signal indicating an engine rotational speed, a signal indicating a generating condition of an alternator and a signal indicating readiness or unreadiness for the start of the vehicle mounted thereon with the engine.

In an embodiment of the present invention, readiness or unreadiness for setting the aforesaid function is judged by "and" of a plurality of signals including at least a signal indicating rotation of an engine of a vehicle and a signal indicating generating condition of the alternator, readiness or unreadiness for the automatic stop of the engine is judged by "and" of a plurality of signals including at least a signal indicating that a clutch pedal is not depressed to a predetermined value, i.e., one of the signals indicating readiness or unreadiness for the start of the vehicle, and readiness or unreadiness for the automatic restart of the engine is judged by "and" of a plurality of signals including at least a signal indicating that an engine rotational speed is less than a predetermined value (i.e., the engine is stopped) and a signal indicating that the alternator is not in generating operation.

BRIEF DESCRIPTION OF THE DRAWINGS

FIGS. 2 through 4 are explanatory views respectively showing operation modes in the control circuit 1, in which FIG. 2 shows an operation mode when a function of automatically stopping an engine and thereafter automatically restarting (hereinafter referred to as 'ERS') is set, FIG. 3 shows an operation mode when the engine is automatically stopped and FIG. 4 shows an operation mode when the engine is automatically restarted.

DESCRIPTION OF THE PREFERRED EMBODIMENT

Figure 1:
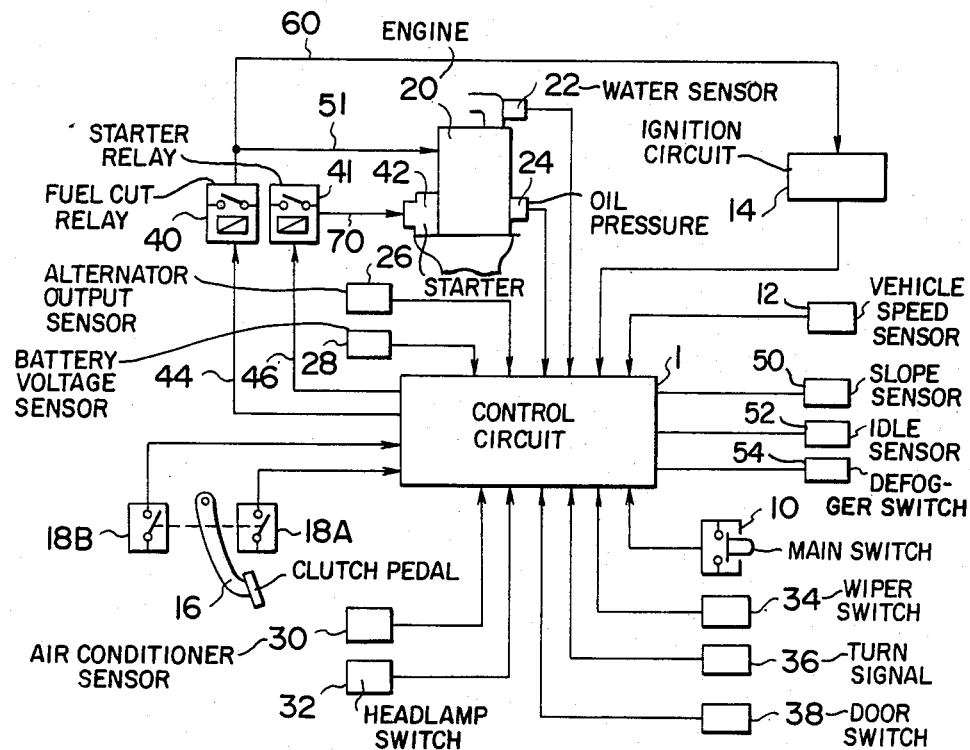
FIG. 1 is a block diagram showing the general arrangement of the automatic engine stop-restart system according to the present invention.

Detailed description will hereunder be given of an embodiment according to the present invention with reference to the drawings. FIG. 1 shows the general arrangement of the automatic engine stop-restart system according to the present invention, in which reference numeral 1 indicates a control circuit, to which are fed detection outputs from various sensors. Designated at 10 is a main switch by which the aforesaid ERS is set or released. After the engine is started by normal operation, if the main switch 10 is pressed under predetermined conditions, then ERS is set. Furthermore, after ERS is set, ERS can be released by manual operation by pressing the main switch 10 again. Otherwise, ERS is automatically releasable under predetermined conditions, which will be described hereinafter.

Further, designated at 12 is a vehicle speed sensor for detecting whether the vehicle is running or stopped. A detecting output from this sensor 12 is used for judgement as to whether the engine is automatically stopped.

Denoted at 14 is an ignition circuit, from which ignition pulse signals are fed to the control circuit 1, where the pulse signals are processed as being an engine rotation signal. As will be described hereinafter, this engine rotation signal is used for judgement of various conditions including the setting of ERS, automatic stop and restart of the engine, and release of ERS. Designated at 16 is a clutch pedal, 18A and 18B a clutch upper switch and clutch lower switch which are operationally associated with the clutch pedal 16 for ON-OFF operation. Both of these switches are used for detecting the amount of the depression of the clutch pedal 16. The clutch upper switch 18A is turned ON when the clutch pedal 16 is depressed to a predetermined percentage to the full stroke, e.g., 30% or more, whereby a signal indicating that the clutch pedal 16 has been depressed to 30% or more is fed to the control circuit 1, so that the control circuit 1 can control the various components not to stop the engine. The clutch lower switch 18B is turned ON when the clutch pedal 16 is depressed to the full stroke, whereby a signal permitting an automatic engine start is fed to the control circuit 1.

The engine 20 is provided thereon with a water temperature sensor 22 adapted to be energized when the temperature of engine cooling water reaches a predetermined value and a hydraulic pressure switch 24 adapted to be energized by a predetermined engine oil pressure, and detection outputs therefrom are fed to the control circuit 1. Designated at 26 is a change-over switch for indicating the generation of the alternator, which is turned OFF when the alternator is in the generating operation. Denoted at 28 is a battery voltage input for detecting the conditions of a battery, and 30 a magnet switch for controlling the operation of the air conditioner, which switch is turned on while the air conditioner is in operation.

Further, denoted at 32 is a head lamp switch for turning head lamps ON or OFF, and 34 a wiper switch for detecting the operating conditions of a wiper. Use of electrical equipments such as head lamps are detected through these switches 30, 32 and 34, i.e., if these electrical equipments have high electrical load. Indicated at 36 is a turn signal switch for detecting whether the vehicle is to turn rightward or not, and 38 a door switch for detecting the opened or closed state of a door on the side of a driver's seat. Out of these detection outputs, the former is utilized as an input for judging an automatic engine stop condition, and the latter is used as an input for judging an ERS setting condition and an ERS release condition. Further, designated at 50 is a slope sensor which detects if a slope of the road surface is more than a predetermined value (2 degrees for example) or not, and, when the slope is more than the predetermined value, the slope sensor is turned ON. Denoted at 52 is an idle switch for detecting if the engine is in idling or not, and when the engine is in idling, the idle switch is turned ON. Denoted at 54 is a defogger switch for detecting if a defogger is in use or not.

After ERS is set by the main switch 10 under the predetermined conditions fulfilled, the automatic stop and restart of the engine 20 are performed as will be described hereunder. More specifically, when the conditions of stopping the engine 20 are fulfilled, the control circuit 1 feeds an engine stop signal 44 to a fuel cut relay 40, whereby the fuel cut relay 40 feeds a fuel cut signal 51 to a fuel cut solenoid, not shown, in a fuel supply system of the engine 20, and feeds an ignition cut signal 60 to the ignition circuit 14, so that the engine can be stopped. To automatically stop the engine, such an arrangement may be adopted that only the ignition cut is effected without performing the fuel cut. In this case, there is presented the disadvantage that the drive feeling is deteriorated because the engine tends to be subjected run-on.

On the other hand, under a situation where ERS is set, when the clutch pedal 16 is fully depressed during engine stopping to turn, the clutch lower switch 18B ON and the other conditions of the automatic engine start to be described hereunder are fulfilled, the control circuit 1 feeds an engine start signal 46 to a starter relay 41, whereby the starter 42 is energized, so that the engine 20 can be started.

Figure 4:
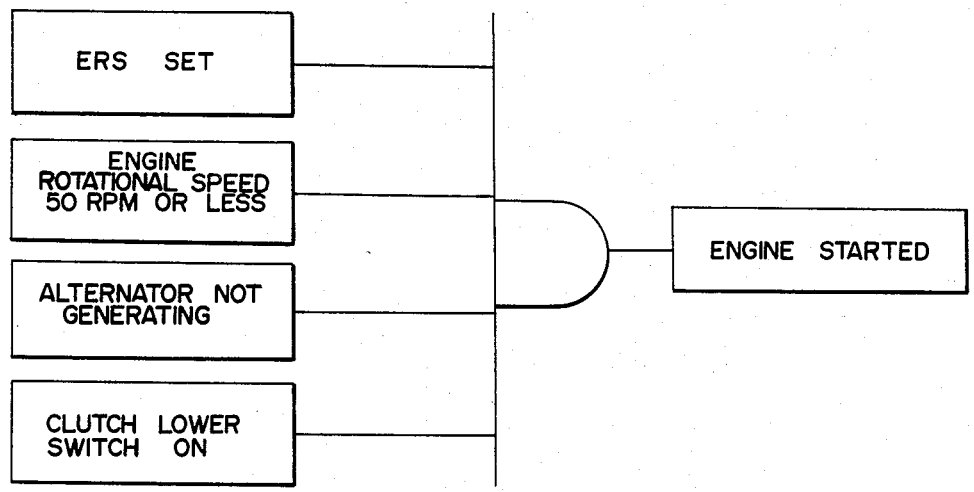
Figure 2:
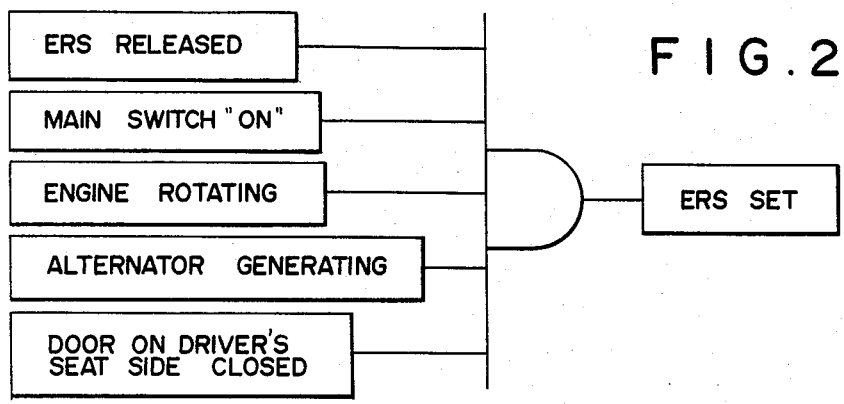
Figure 3:
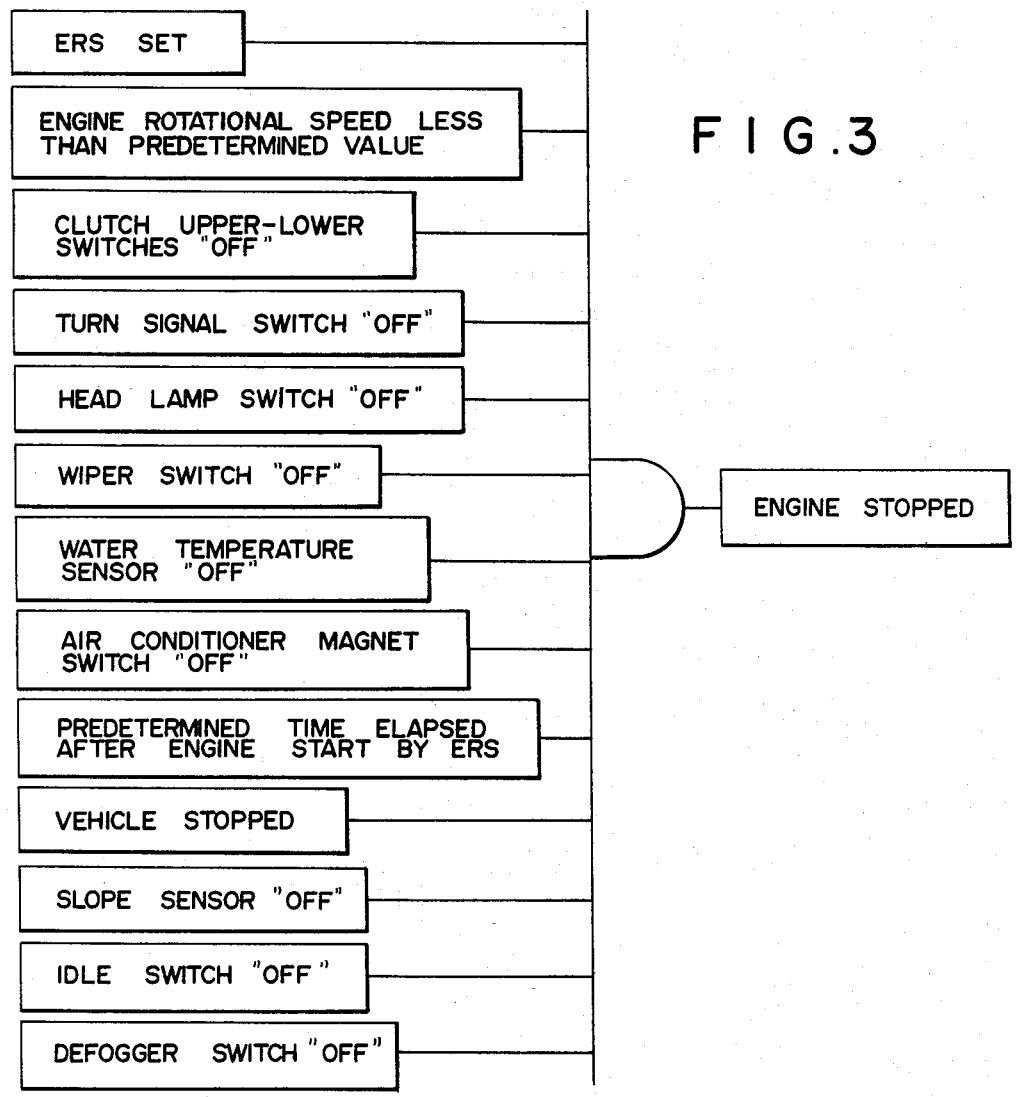

Description will hereunder be given of the respective operation modes of the automatic engine stop-restart system as shown in FIG. 1 including the ERS setting mode, the engine stop mode and engine start mode after ERS is set with reference to FIGS. 2 through 4. FIG. 2 shows the operation mode of ERS setting, and, when "and" of the following five conditions is fulfilled as shown in FIG. 2, ERS setting can be done.

(1) ERS setting has been released.
(2) The main switch for ERS setting is on.
(3) The engine is rotating, the engine rotational speed is 400±50 rpm or more, for example.
(4) The alternator is in the generating operation.
(5) The door on the side of the driver's seat is in the closed state (detected by the door switch 38).

There are two cases of releasing ERS setting in (1), including one case of manually releasing through pressing on the main switch 10 and the other case of automatically releasing. These two cases will be described hereinafter. Judgement as to whether the engine is rotating or not is made through the engine rotational speed in (3) and the generating condition of the alternator in (4). This is done for reliably detecting if the engine is rotating or not.

FIG. 3 shows the operation mode of the automatic engine stop. As shown in FIG. 3, when "and" of the following conditions (1) through (13) is fulfilled, the engine is automatically stopped.

(1) ERS has been set.
(2) The engine rotational speed is a predetermined value, e.g., 850 rpm or less.
(3) Both the clutch upper switch 18A and the clutch lower switch 18B are OFF, i.e., the clutch pedal 16 has not been depressed to a predetermined value or more.
(4) The turn signal switch 36 is OFF, i.e., a right turn signal is not emitted.
(5) The head lamp switch 32 is OFF.
(6) The wiper switch is OFF.
(7) The water temperature sensor 22 is OFF, i.e., the temperature of engine cooling water remains within a specific temperature range, e.g., 75° C.~105° C.
(8) The air conditioner magnet switch 30 is OFF.
(9) A predetermined period of time, 4 SEC for example, has elapsed after the engine is started by ERS.
(10) The vehicle is in a stopped state.
(11) The slope sensor 50 is OFF.
(12) The idle switch 52 is OFF.
(13) The defogger switch 54 is OFF.

Out of above-described conditions, "(2) The engine rotational speed is 850 rpm or less" is adopted in consideration of that during racing the automatic engine stop is not to be performed, and "(3)" is provided for the reason that the clutch pedal can be depressed only when the engine is started or the gear shift is effected, and in this system the engine can be restarted by the depression of the clutch pedal.

(4) is adopted as a condition of judging because, at the time of right turn of the vehicle, the driver is required to pay attention to ascertaining the presence of a car running in the opposite direction and the like, and, it is not desirable to stop the engine under the aforesaid conditions. The reason why (5), (6), (8) and (13) are utilized for judging the engine stop is that it is avoided to overdischarge the battery due to the engine stop at a high electrical load. Condition (7) is adopted for not stopping the engine in the low and high temperature ranges of the engine cooling water because it is difficult for the engine to start in those temperature ranges. Condition (9) is adopted for preventing the automatic engine stop and restart from being repeated within a short period of time. Condition (10) "The vehicle is in a stopped state" is judged by the presence of the change in level of a detection output (pulse train signal) of the vehicle speed sensor 12.

As has been described hereinabove, in the automatic engine stop-restart system according to the present invention, the engine rotation signal and the clutch signal operationally associated with the clutch pedal are used as the conditions of judging whether the automatic engine should be stopped or not.

FIG. 4 shows the operation mode of the automatic engine start by ERS. As shown in FIG. 4, when "and" of the following conditions (1) through (4) is fulfilled, the engine is automatically restarted.
(1) ERS has been established.
(2) The engine rotational speed is less than a set rotational speed, e.g., 50 rpm or less.
(3) The alternator is not in the generating condition.
(4) The clutch lower switch 18B is ON, i.e., the clutch pedal is fully depressed.

Out of the above-described conditions, (2) and (3) are adopted for judging the engine stopped state. Both the engine rotation signal and the alternator's generating condition signal are adopted because, even when either one of the engine rotation signal and the alternator's generating condition signal is not fed to the control circuit 1 due to some reason or other despite of rotation of the engine, reliable judgement on the rotation of the engine can be performed.

Release of ERS after ERS has been set is performed as follows:
(A) To release by manual operation
After the main switch 10 has been pressed, if the main switch 10 is pressed again, then ERS setting is released.
(B) To automatically release
  (1) When the engine is restarted by manual operation of the ignition switch
  (2) When the door on the side of the driver's seat is opened
  (3) When the battery is lowered in voltage
  (4) When a predetermined period of time, e.g., 2 SEC, has elapsed until the engine rotational speed reaches a certain value, 550 rpm for example, at the time of restart by ERS In all of the above-described cases, ERS setting is automatically released. Out of the above-mentioned conditions, (1) is adopted for that, when the engine is restarted by manual operation of the key switch in spite of that the engine has been automatically stopped by ERS, ERS must be released to prevent ERS to drive the starter again. (2) is adopted for that, in consideration of a replacement of the driver by a new one, when the door switch 38 is actuated, ERS is released, so that a driver unfamiliar with ERS may not be confused. (3) is adopted because, when the ERS is kept on under lowered battery capacity, the restart cannot easily be effected. Similarly, (4) is adopted for that, in consideration of the lowered capacity of the battery, when the engine is restarted under the condition (4), ERS is released, and thereafter the engine is started and stopped by means of an ordinary ignition switch.

In addition, in the description of FIG. 3, there have been included signals of use of the air conditioner and use of the defogger. However, needless to say, in the vehicle without those components, there is no necessity for providing those two types of signals.

What is claimed is:

1. A system for automatically stopping and restarting a motor vehicle engine having an alternator that is coupled to said engine in response to predetermined conditions comprising:
  stopping means coupled to said engine for stopping said engine;
  starting means coupled to said engine for restarting said engine;
  engine rotational speed sensor means coupled to said engine for detecting an engine's rotational speed to generate a speed signal corresponding to said engine's rotational speed;
  alternator output level sensor means coupled to said alternator for detecting an output level of said alternator to generate an alternator signal corresponding to said output level;
  a first judging means coupled to said engine's rotational speed sensor means for judging as to whether said speed signal indicates said engine's rotational speed exceeding a predetermined level to produce a first signal indicative of said engine being rotating;
  a second judging means coupled to said alternator output level sensor means for judging as to whether said alternator signal indicates the output level exceeding a predetermined level to produce a second signal indicative of said alternator being generating;
  switching means manually operated for producing a third signal while said switching means is turning on;
  a third judging means coupled to said first and second judging means and said switching means for producing an enable signal when at least said first, second and third signals are received by said third judging means;
  a fourth judging means coupled to said third judging means and various sensors detecting engine operational conditions for judging as to whether a first condition for automatic engine stop is fulfilled to produce a first activating signal when fulfilled, said first condition including at least a presence of said enable signal, and said stopping means being energized by said first activating signal; and
  a fifth judging means coupled to said third judging means and said various sensors for judging as to whether a second condition for automatic engine restart is fulfilled to produce a second activating signal when fulfilled, said second condition including the presence of said enable signal, and said starting means being energized by said second activating signal.

2. A system according to claim 1, wherein said stopping means comprises a relay connected to an ignition circuit and a solenoid valve for cutting off fuel to a fuel injection valve, and wherein said starting means comprises a starter relay and a starter connected thereto.

3. A system according to claim 1, wherein said engine rotational speed sensor means receives a pulse signal outputted from an ignition circuit to process the received pulse signal in such a manner so as to produce said speed signal.

4. A system according to claim 1, wherein said system further comprises:
a door switch means for detecting a closed state of a driver's seat door to produce a door signal when the driver's seat door is closed, and said third judging means is further connected to said door switch to produce the enable signal when said first, second and third signals and said door signal are receive by said third judging means.

* * * * *